(12) United States Patent
Biswas

(10) Patent No.: US 9,246,836 B2
(45) Date of Patent: Jan. 26, 2016

(54) SINGLE PRODUCER, SINGLE CONSUMER LOCKLESS FIFO/LIFO QUEUE

(75) Inventor: Shubhra Sankar Biswas, Oak Park, IL (US)

(73) Assignee: Sybase, Inc., Dublin, CA (US)

( * ) Notice: Subject to any disclaimer, the term of this patent is extended or adjusted under 35 U.S.C. 154(b) by 378 days.

(21) Appl. No.: 13/599,527

(22) Filed: Aug. 30, 2012

(65) Prior Publication Data

US 2014/0064291 A1 Mar. 6, 2014

(51) Int. Cl.
| | |
|---|---|
| *H04L 12/863* | (2013.01) |
| *H04L 12/861* | (2013.01) |
| *H04L 12/883* | (2013.01) |
| *H04L 12/54* | (2013.01) |
| *H04L 12/70* | (2013.01) |
| *H04L 12/721* | (2013.01) |
| *H04L 12/741* | (2013.01) |
| *H04L 12/935* | (2013.01) |

(52) U.S. Cl.
CPC .................................. *H04L 47/624* (2013.01)

(58) Field of Classification Search
CPC . H04L 49/90; H04L 49/9015; H04L 47/6245; H04L 47/624
USPC ................. 370/412, 413, 415, 417, 429, 440; 711/158–160; 718/102, 103; 719/313, 719/314
See application file for complete search history.

(56) References Cited

U.S. PATENT DOCUMENTS

| | | | | |
|---|---|---|---|---|
| 5,671,446 | A * | 9/1997 | Rakity et al. | 710/54 |
| 6,487,202 | B1 * | 11/2002 | Klausmeier et al. | 370/395.1 |
| 2002/0114338 | A1 * | 8/2002 | Craig et al. | 370/401 |
| 2003/0081624 | A1 * | 5/2003 | Aggarwal et al. | 370/412 |
| 2004/0160960 | A1 * | 8/2004 | Monta et al. | 370/395.4 |
| 2005/0270977 | A1 * | 12/2005 | King et al. | 370/235 |

OTHER PUBLICATIONS

Chisnall, David, "Writing Concurrent Systems, Part 2: Lockless Data Structures", Sep. 20, 2010, 2 pages, http://www.informit.com/articles/article.aspx?p=1626980.
Hedstrom, Kjell, "Lock-Free Single-Producer—Single Consumer Circular Queue", Jun. 9, 2011, 7 pages, http://www.codeproject.com/Articles/43510/Lock-Free-Single-Producer-Single-Consumer-Circular.

* cited by examiner

*Primary Examiner* — Un C Cho
*Assistant Examiner* — Peian Lou
(74) *Attorney, Agent, or Firm* — Sterne, Kessler, Goldstein & Fox P.L.L.C.

(57) ABSTRACT

A query inserter receives data elements having individual priority types for placement in a queue, and utilizes the priority types of the received data elements to determine placement in the queue relative to an initial location established when a first data element is placed in an empty queue in order to manage the queue with a combination of first-in first-out and last-in first-out queue functionality.

16 Claims, 10 Drawing Sheets

SINGLE PRODUCER, SINGLE CONSUMER LOCKLESS FIFO/LIFO QUEUE

BACKGROUND

A thread may add requests to a queue, and another thread may remove requests from the queue. Manipulating a request may require multiple instructions. The queue is a shared resource and a race condition may occur if, for example, a thread attempts to read from the queue while another thread attempts to add a request to the queue. For example, if one thread attempts to read from the queue while another is in the middle of manipulating the queue, the reading thread may find the queue in an inconsistent state. This may result in corruption of the queue.

A common mechanism for ensuring that only one thread manipulates the queue at a time is to provide a locking mechanism for the queue. For example, if a thread attempts to add a request to the queue, the thread first obtains a lock and then safely adds the request to the queue. After adding the request, the thread releases the lock to allow another thread to manipulate the queue. Locking, however, is relatively expensive and can limit scalability. The more locks that are implemented in a system, the more time is spent acquiring and releasing those locks, which is a relatively expensive operation.

Further, an example of a widely used queue is a first-in, first-out (FIFO) queue. In a FIFO queue, data elements inserted before other data elements are removed before the other data elements. Accordingly, a high priority request in a FIFO queue must wait until other requests in the queue have been removed before the high priority request is serviced. This may lead to undesirable results.

BRIEF SUMMARY

System, method, and computer program product embodiments for managing a lockless queue are provided. In an embodiment, a single producer thread and a single consumer thread manipulate the lockless queue. According to an example method, data elements having individual priority types are received for placement in a queue. The priority types of the received data elements are utilized to determine placement in the queue relative to an initial location established when a first data element is placed in an empty queue in order to manage the queue with a combination of first-in first-out and last-in first-out queue functionality.

Further features and advantages, as well as the structure and operation of various embodiments thereof, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Figure 1:
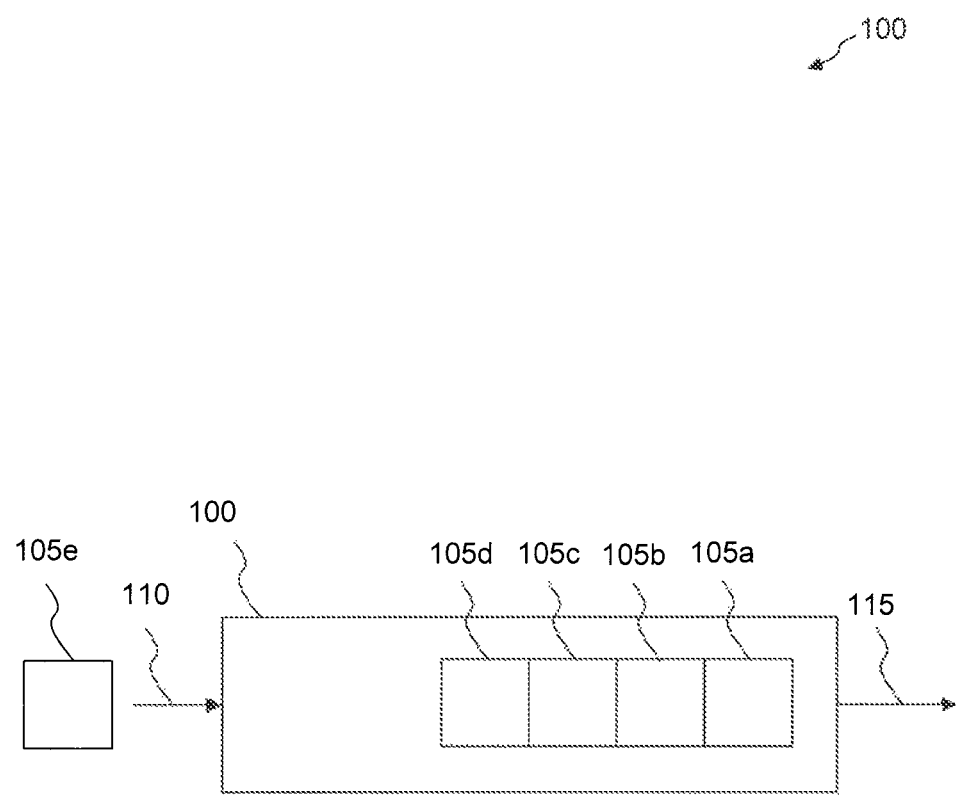
FIG. 1 illustrates an example First-in, First-out queue.

Features and advantages of embodiments will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

I. Overview
II. FIFO Queue
III. FIFO/LIFO Queue
   A. Priority Types
   B. Insertion of Data Elements
   1. Insertion of Data Elements of the First Priority Type
   2. Insertion of Data Elements of the Second Priority Type
   C. Removal of Data Elements
IV. Example System Embodiment
V. Example Method Embodiment
VI. Example Computer Implementation Embodiment

I. Overview

The following detailed description refers to the accompanying drawings that illustrate exemplary embodiments. Other embodiments are possible, and modifications can be made to the embodiments within the spirit and scope of the embodiments. Therefore, the detailed description is not meant to limit the embodiments. Rather, the scope of the embodiments is defined by the appended claims.

A queue is a collection in which data elements are stored and retrieved in a specific order. In an example, a producer thread may produce one or more data elements and place the one or more data elements in a data structure, such as a queue. A consumer thread may remove a data element from the queue and process the data element.

Described herein are embodiments for managing a lockless FIFO/LIFO queue. In an example, managing a lockless FIFO/LIFO queue may include receiving data elements having individual priority types for placement in a queue, and utilizing the priority types of the received data elements to determine placement in the queue relative to an initial location established when a first data element is placed in an empty queue in order to manage the queue with a combination of first-in first-out and last-in first-out queue functionality. In an example, a first-in first-out data element may have a first priority type and a last-in first-out data element may have a second priority type.

Further, this disclosure describes a data element of a second priority type having a higher priority than a data element of a first priority type. It should also be recognized that in some embodiments, a data element of a first priority type may have a higher priority than a data element of a second priority type.

II. FIFO Queue

FIG. 1 illustrates an example First-in, First-out (FIFO) queue 100. In a FIFO queue, a data element that is inserted before other data elements in the FIFO queue will be removed before the other data elements. In this disclosure, a data element that is said to be "inserted before" another data element in the queue is removed from the queue before the other data element. Similarly, a data element that is said to be "inserted after" another data element in the queue is removed from the queue after the other data element.

In FIFO queue 100, data elements are inserted at a first end (e.g., tail) 110 of FIFO queue 100 and removed at a second end (e.g., head) 115 of FIFO queue 100.

Queue 100 includes data elements 105a-105d. In an example, a producer thread produces data elements 105a-105d, respectively, and inserts them at tail end 110 of FIFO queue 100, respectively. The producer thread may then produce data element 105e, and insert it at tail end 110 of FIFO queue 100 after data element 105d.

A consumer thread may remove data elements from head end 115 of FIFO queue 100. In an example, the consumer thread removes data element 105a before removing other data elements. After removing data element 105a, the consumer thread may then remove data elements 105b-105d, respectively.

The inventor recognized that a FIFO queue may contribute to unnecessary delays in an urgent data element being removed from the queue and processed. For example, the producer thread may produce a high priority data element 105e, and thus it may be undesirable for high priority data element 105e to wait until all other data elements (e.g., data elements 105a-105d) in FIFO queue 100 have been removed.

One solution provided by the inventor in this disclosure includes allowing data elements to have different priority types such that data elements having a higher priority type are added before (closer to the head of the queue) data elements having a lower priority type in the queue. Thus, the removal of data elements may be prioritized based on a priority type of each data element. Further, a lockless queue is provided so that insertions of data elements in the queue are not stalled waiting for other data elements to be read from the queue.

In an embodiment, a single producer and a single consumer operate on a lockless FIFO/LIFO queue. More details on the queue arrangement are below.

III. FIFO/LIFO Queue

A. Priority Types

According to an embodiment, data elements having individual priority types are inserted in the queue. The priority type of a data element is considered when it is inserted in the queue. In an example, the priority types of the data elements are utilized to determine placement in the queue relative to an initial location established when a first data element is placed in an empty queue.

In an embodiment, a data element inserted in a queue may be of a first priority type or a second priority type. A priority type may indicate an urgency of the data element. For example, a data element of the second priority type may have a greater urgency for servicing than a data element of the first priority type. Accordingly, the data element of the second priority type may be serviced before a data element of the first priority type.

Figure 2:
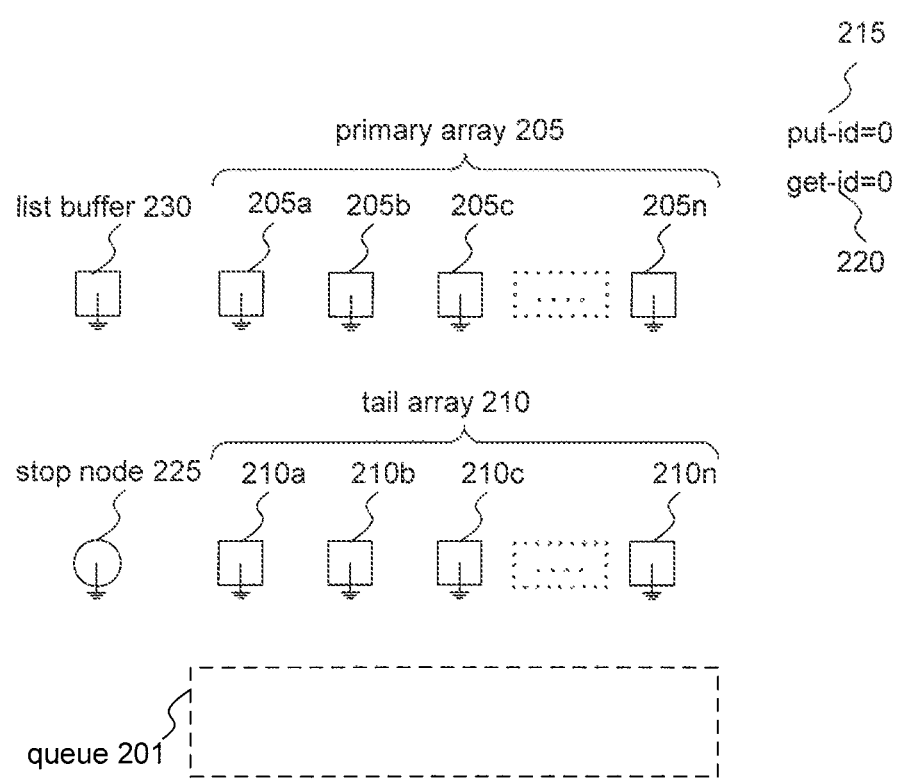
FIG. 2 illustrates a FIFO/Last-in, First-out (LIFO) queue arrangement, according to an example embodiment.

FIG. 2 illustrates a FIFO/Last-in, First-out (LIFO) queue arrangement, according to an example embodiment. In a typical LIFO queue, a data element is inserted and removed at one end of the queue, such that the last element inserted is the first element removed.

FIG. 2 illustrates a lockless FIFO/LIFO queue 201 that is empty and does not include any data elements. Queue 201 may include data elements of different priority types. In an embodiment, queue 201 is a circular buffer including one or more linked lists.

A producer thread may produce one or more data elements and insert the data elements in queue 201. A consumer thread may remove data elements from queue 201 and process the one or more data elements.

FIG. 2 also shows a primary array 205, a tail array 210, and indices put-id 215 and get-id 220. Primary array 205 includes primary array elements 205a-205n and may store up to N references to data elements of a first priority type that are inserted in the queue. Primary array element 205a is at position zero in primary array 205, primary array element 205b is at position one in primary array 205, and primary array element 205n is at position n in primary array 205. Index put-id 215 references the next available position in primary array 205 that may be used to insert a data element in queue 201.

Queue 201 may include a linked list of data elements (not shown in FIG. 2). Tail array 210 includes tail array elements 210a-210n and may store a reference to an end of the linked list in queue 201. Tail element 210a is at position zero in tail array 210, tail array element 210b is at position one in tail array 210, and tail array element 210n is at position n in tail array 210. The linked list in queue 201 may include one or more data elements that include references. Index get-id 220 references a position in primary array 205 that may be used to remove a data element from queue 201.

FIG. 2 also shows a stop node 225 and a list buffer 230. In an embodiment, data elements may be added or removed from queue 201 without requiring locks. Stop node 225 and list buffer 230 may assist in providing this advantage. Accordingly, it may be unnecessary for a producer thread to wait until all data elements to be removed have been removed from queue 201 before inserting a data element in queue 201.

Stop node 225 may close the linked list in queue 201, preventing additional data elements from being added to the linked list in queue 201. In an embodiment, preventing additional data elements from being added to the linked list in queue 201 includes identifying a most recently inserted data element in the linked list in queue 201 and updating the reference included in the most recently inserted data element to reference stop node 225.

When a data element in the linked list in queue 201 references stop node 225, this indicates to the producer thread that the linked list in queue 201 is closed. The producer thread may then insert data elements at another position in queue 201. In this way, queue 201 is accessible even when the consumer thread reads data elements from queue 201. Subject to memory constraints, queue 201 does not block when data elements are inserted into the linked list in queue 201. Accordingly, data elements having a high urgency (e.g., data elements of the second priority type) will always be enqueued, and it is unnecessary for the producer thread to wait until the data elements have been read from queue 201 before inserting data elements in queue 201.

List buffer 230 may reference a head of the linked list of data elements in queue 201, and the linked list may be delinked from primary array 205. As such, list buffer 230 may reference the linked list that is no longer in queue 201. The data elements in the linked list may be traversed and processed without conflicting with data elements being inserted in queue 201.

The FIFO/LIFO queue arrangement of FIG. 2 may be lockless and use an atomic compare-and-swap instruction. A compare-and-swap instruction ensures that the threads will have a consistent view of any location in queue 201 and do not change the shared resource at the same time. For example, contention may occur if at approximately the same time, the producer thread inserts a data element having a second priority type in queue 201 by trying to append the data element at the tail of the linked list and the consumer thread updates the most recently inserted data element in the linked list in queue 201 to reference stop node 225. The compare-and-swap instruction may be used to determine whether the most recently inserted data element in the linked list references stop node 225 or a NULL value. If the most recently inserted data element in the linked list references stop node 225, then the linked list is closed and the producer thread does not insert a data element into the linked list. Rather, the producer thread inserts a data element at the next available position in queue 201. For example, the producer thread may update another linked list at the next available position in queue 201 and insert the data element into this linked list.

Further, read and write of integral values of less than or equal to the bus width may be atomic operations.

Data to be inserted in queue 201 may be stored in a data structure. A data element in the linked list may, for example, include a reference to another data element in the linked list, a value such as NULL, or stop node 225. A reference may be, for example, a pointer to another data element. The data to be inserted in queue 201 may be stored in a node having a reference to another node (e.g., the next node in queue 201) or to a value such as NULL. In an example, a Node data element includes a "next" pointer that points to the next data element in queue 201. The next data element in queue 201 may be the next data element to be removed from queue 201 after the data element that references the next data element is removed.

B. Insertion of Data Elements

Data elements may be inserted in queue 201 based on a priority type of the data element. According to an embodiment, inserting the data element in queue 201 may include determining whether queue 201 is empty. When queue 201 is determined to be empty, a received data element is inserted at an initial location in queue 201. As such, when queue 201 is empty, inserting a data element of a first priority type may be functionally the same as inserting a data element of the second priority type in queue 201.

When queue 201 is determined to be not empty, it is determined whether the received data element is of a first priority type or a second priority type. Utilizing the priority types of the received data elements to determine placement in the queue relative to an initial location may include when the received data element is determined to be of the first priority type, the received data element is inserted in queue 201 after each existing data element of the first priority type in queue 201 (i.e., closer to the tail end of queue 201). Utilizing the priority types of the received data elements to determine placement in the queue relative to an initial location may also include when the received data element is determined to be of the second priority type, the received data element is inserted in queue 201 before each existing data element of the first priority type after the initial location in queue 201 (i.e., closer to the head end of queue 201).

1. Insertion of Data Elements of the First Priority Type

Figure 3:
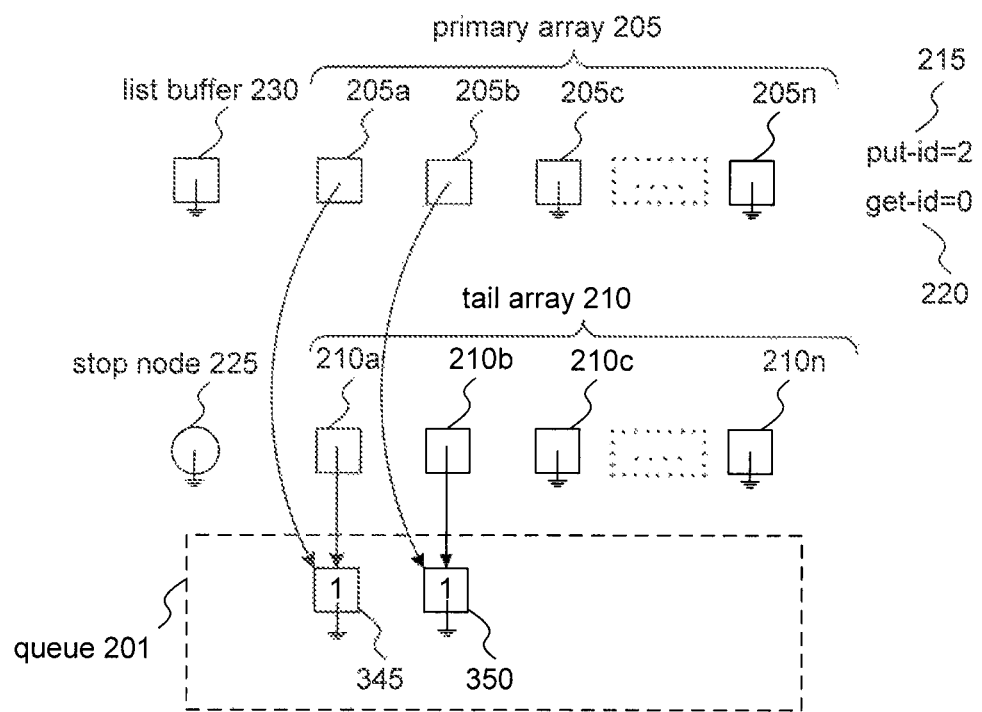
FIG. 3 illustrates a FIFO/LIFO queue after two data elements of the first priority type have been inserted in a queue, according to an example embodiment.

Related to FIG. 2, FIG. 3 illustrates a FIFO/LIFO queue 201 after two data elements of the first priority type 345, 350 have been inserted in queue 201 from FIG. 2, according to an example embodiment. Referring to FIG. 2, prior to insertion of elements 345 and 350, queue 201 is empty and index put-id 215 is equal to zero, indicating that position zero in primary array 205 is the next available position in primary array 205 that may be used to insert a data element in queue 201.

In the example of FIG. 3, a producer thread produces data elements of the first priority type 345 and 350. The producer thread inserts data element 345 in queue 201 at an initial location, and both primary array 205 and tail array 210 are updated to point to data element 345. In particular, primary array element 205a at position zero in primary array 205 is updated to reference data element 345, and tail array element 210a at position zero is updated to reference data element 345, the most recently inserted data element in the linked list in queue 201. Accordingly, a first linked list including one data element is generated that includes data element 345. Also, index put-id 215 is incremented to one, indicating that position one in primary array 205 is the next available position in primary array 205 that may be used to insert a data element in queue 201. In an embodiment, index "put-id" 215 is incremented only after primary array 205 and tail array 210 have been updated to point to the data element 345. In this way, the consumer thread will not attempt to read the data element before producer thread is done inserting the data element in queue 201.

The producer thread then produces data element 350. The producer thread determines whether data element 350 is of a first priority type or a second priority type. For purposes of illustration, assume data element 350 is of the first priority type, indicated by a "1" in data element 350. The producer thread then inserts data element 350 in queue 201 after each existing data element of the first priority type in queue 201. In particular, the producer thread may insert data element 350 in queue 201 after data element 345, closer to the tail end of queue 201. Both primary array 205 and tail array 210 are updated to point to data element 350. In particular, primary array element 205b at position one in primary array 205 is updated to reference data element 350, and tail array element 210b at position one in tail array 210 is updated to reference data element 350 at the tail end of a linked list, different from the linked list that includes data element 345, in queue 201. Accordingly, a second linked list including one data element is generated that includes data element 350.

Index put-id 215 is incremented to two, indicating that position two in primary array 205 is the next available position in primary array 205 that may be used to insert a data element of the first priority type in queue 201.

In an embodiment, the example code shown below (or functionally similar code) may be used to insert a data element of the first priority type in queue 201 after each existing data element of the first priority type in queue 201.

```
bool insert_firstprioritytype(Node * node)
{
    if (putid + 1 % SIZE == getid) // queue is full
    return false;
    array[putid] = node;
    tails[putid] = node;   // insert_firstprioritytype ( ) always places a
                           //node into an empty slot,
                           //point the tail for this slot to the new node
```

```
    putid = putid + 1% SIZE;    // increment put index and roll over, if
                                   needed
    return true;
}
```

After executing the above code (or functionally similar code), a data element of the first priority type is inserted into the next available position in queue 201, and index put-id 215 is incremented modulo N. Further, primary array 205 and tail array 210 are updated to point to a new data element of the first priority type. If queue 201 is full, a false value is returned.

2. Insertion of Data Elements of the Second Priority Type

Figure 4:
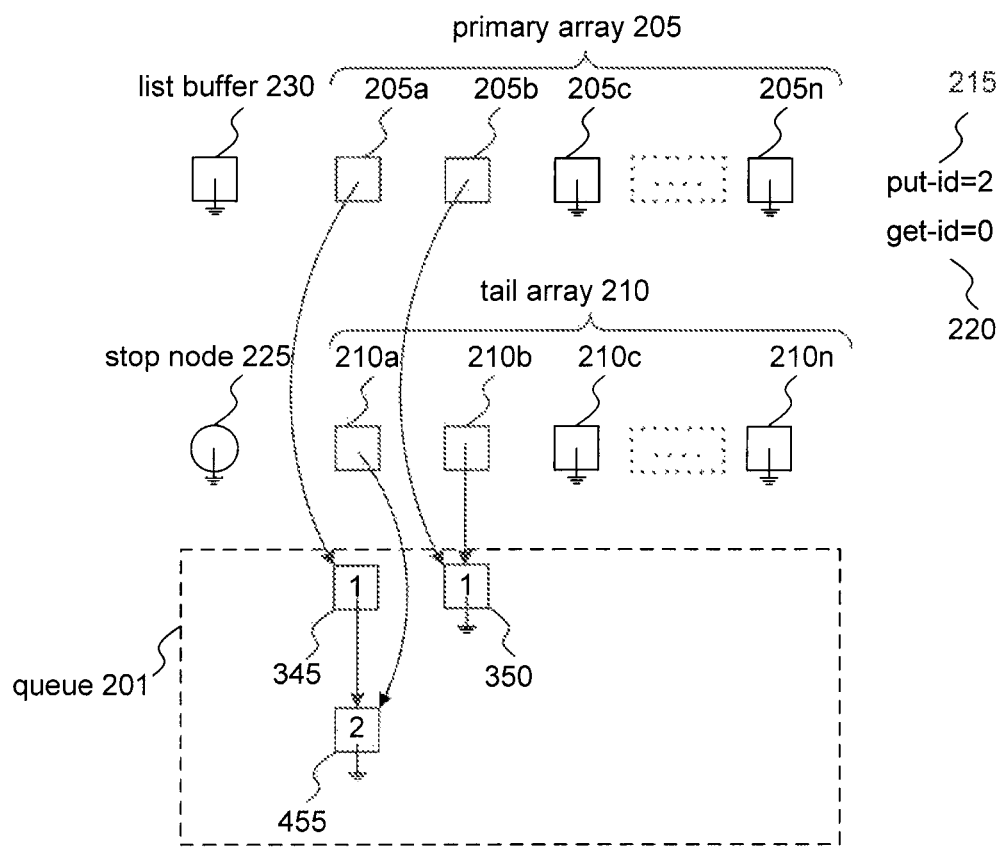
FIG. 4 illustrates a FIFO/LIFO queue after a data element of the second priority type has been inserted in a queue, according to an example embodiment.

FIG. 4 illustrates the example FIFO/LIFO queue 201 after a data element of the second priority type 455 has been inserted in queue 201 in FIG. 3, according to an example embodiment.

The producer thread produces data element of the second priority type 455. To insert a data element in queue 201, it is determined whether queue 201 is empty. Referring back to the example of FIG. 3, queue 201 is not empty and includes data elements 345 and 350. The producer thread then determines whether new data element 455 is of a first priority type or a second priority type. For illustrative purposes, assume data element 455 is of the second priority type, indicated by a "2" in data element 455.

The producer thread then inserts data element 455 in queue 201 after the initial location in queue 201. The initial location in queue 201 is a location of an oldest data element relative to the existing data elements in queue 201. In an example, in queue 201, data element 345 is at an initial location in queue 201. Accordingly, the producer thread inserts data element 455 in queue 201 before each existing data element of the first priority type after data element 345.

In the example of FIG. 4, inserting data element 455 in queue 201 before each existing data element of the first priority type after the initial location in queue 201 involves inserting data element 455 into the first linked list including data element 345. In particular, the producer thread may insert data element 455 at the tail end of the first linked list.

In an example, a most recently inserted data element in the first linked list may be identified. Data element 345 is the most recently inserted data element in the first linked list. The first linked list includes an oldest data element in the queue. The oldest data element in queue 201 may be identified by determining the value of index get-id 220. For example, in FIG. 3, index get-id 220 is zero. Accordingly, position zero in tail array 210, tail array element 210a, references data element 345, the most recently inserted data element in the first linked list. Data element 345 is also the oldest data element in queue 201. Data element 455 is inserted into the first linked list by updating the reference included in data element 345 to reference the newly inserted data element 445 of the second priority type using, for example, the compare and swap operation. In an example, the compare and swap operation checks whether the reference included in data element 345 points to NULL. If so, the first linked list is not closed and an additional data element (e.g., data element 455) can be appended to the first linked list. Tail array element 210a is then updated to point to data element 455, which is now the new tail of the first linked list.

Thereafter, queue 201 includes data elements 345, 350, and 455, primary array 205a references data element 345, and tail array 210a references data element 455, the most recently inserted data element in the first linked list.

The producer thread may insert another data element in the first linked list by inserting the new data element at the new tail end of the first linked list. For example, in FIG. 4, another new data element of the second priority type may be inserted into the first linked list after data element 455 by updating the reference included in data element 455 to reference the newly inserted data element of the second priority type. Tail array 210a may then be updated to reference the newly inserted data element of the second priority type.

In an embodiment, the code shown below (or functionally similar code) may be used to insert a data element of the second priority type in queue 201 before each existing data element of the first priority type.

```
bool insert_secondprioritytype (Node * node)
{
    int getlocal = getid;       // store the get index locally
    if (putid == getid) {        // the queue is empty, only insert_xxx
                                   operations can
    array[putid] = node;         // change this state, so there is no
                                   contention with dequeue
    tails[putid] = node;
    putid = putid + 1% SIZE;
    return true;
    }
    else {                       // the queue is not empty, we are
                                   going to
    Node * temp = tails[getlocal];   // put this on the tail
       Node * next = temp->next;
    if (next == &stopNode)       // dequeue( ) has marked this list as
                                   closed, try again
    return false;    // this time in the next slot.
    if CAS(&temp->next, NULL, &stopNode) //CAS is
    CompareAndSwap
    {
    tails[getlocal] = value;     // we have managed to insert the node
                                   at the end of
    return true;                 // the list, swing the tail pointer to us
    }
    }
    return false;
}
```

After executing the above code (or functionally similar code), a data element of the second priority type is inserted into the linked list in queue 201. If queue 201 is empty, inserting a data element of the second priority type is functionally the same as inserting a data element of the first priority type in queue 201. If queue 201 is not empty, index get-id 220 is used to determine the location of the oldest data element of the first priority type relative to the existing data elements of the first priority type in queue 201. The newly inserted data element of the second data type is linked to the oldest data element of the first priority type, creating the linked list. To create the linked list, the current terminator is checked for NULL (e.g., by using atomic compare-and-swap), and the new data element of the second priority type is inserted at the end of the linked list. If the current terminator is stop node 225, the linked list has been closed, and a false value is returned. The next call will attempt to insert the data element of the second priority type at the next available location in the queue.

C. Removal of Data Elements

Data elements may be removed from the queue based on a priority type of the data element. Removing one or more data elements from the queue may include removing a linked list from the queue. The linked list may include an oldest data element in the queue.

In an embodiment, removing one or more data elements includes preventing additional data elements from being added to the linked list including one or more data elements.

The linked list may include a data element of the first priority type and zero or more data elements of the second priority type. In an example, an oldest data element relative to the existing data elements in queue 201 is identified. The oldest data element is at a head of the linked list. The linked list is removed from queue 201. The removed linked list may be traversed starting at the head of the removed linked list. One or more data elements in the removed linked list is processed based on an order in which the removed linked list is traversed.

Figure 5:
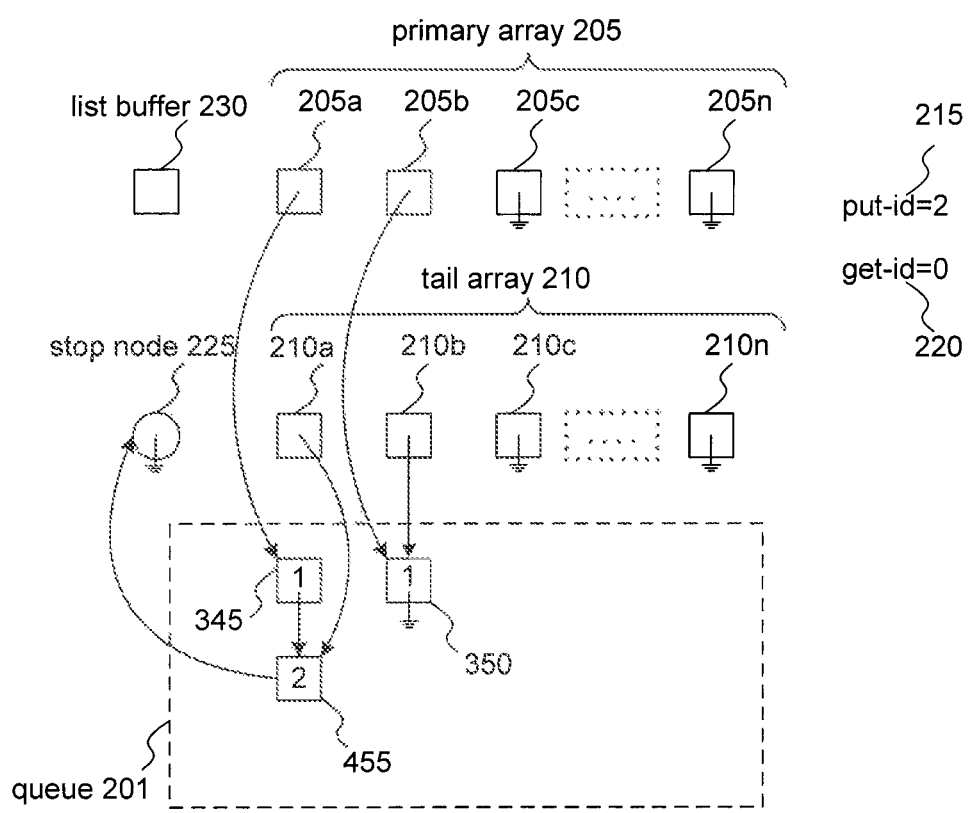
FIG. 5 illustrates a FIFO/LIFO queue after a linked list in a queue has been closed, according to an example embodiment.

FIG. 5 illustrates FIFO/LIFO queue 201 after the linked list in queue 201 in FIG. 4 has been closed, according to an example embodiment. Closing the linked list prevents additional data elements from being added to the linked list. Referring back to FIG. 4, queue 201 includes data elements 345, 350, and 455. Data elements 345 and 350 are of the first priority type, and data element 455 is of the second priority type.

In an embodiment, preventing additional data elements from being added to the linked list includes identifying a most recently inserted data element in the linked list, and updating a reference included in the most recently inserted data element to reference stop node 225. The most recently inserted data element in the linked list is identified by determining the value of index get-id 220. For example, in FIG. 4, index get-id 220 is zero. Accordingly, position zero in tail array 210, tail array element 205a, references data element 455, the most recently inserted data element in the linked list in queue 201.

In the example of FIG. 5, data element 455 is the most recently inserted data element in the linked list. The reference included in data element 455 is updated to reference stop node 225 using the compare and swap operation. In this way, additional data elements are prevented from being added to the linked list.

Figure 6:
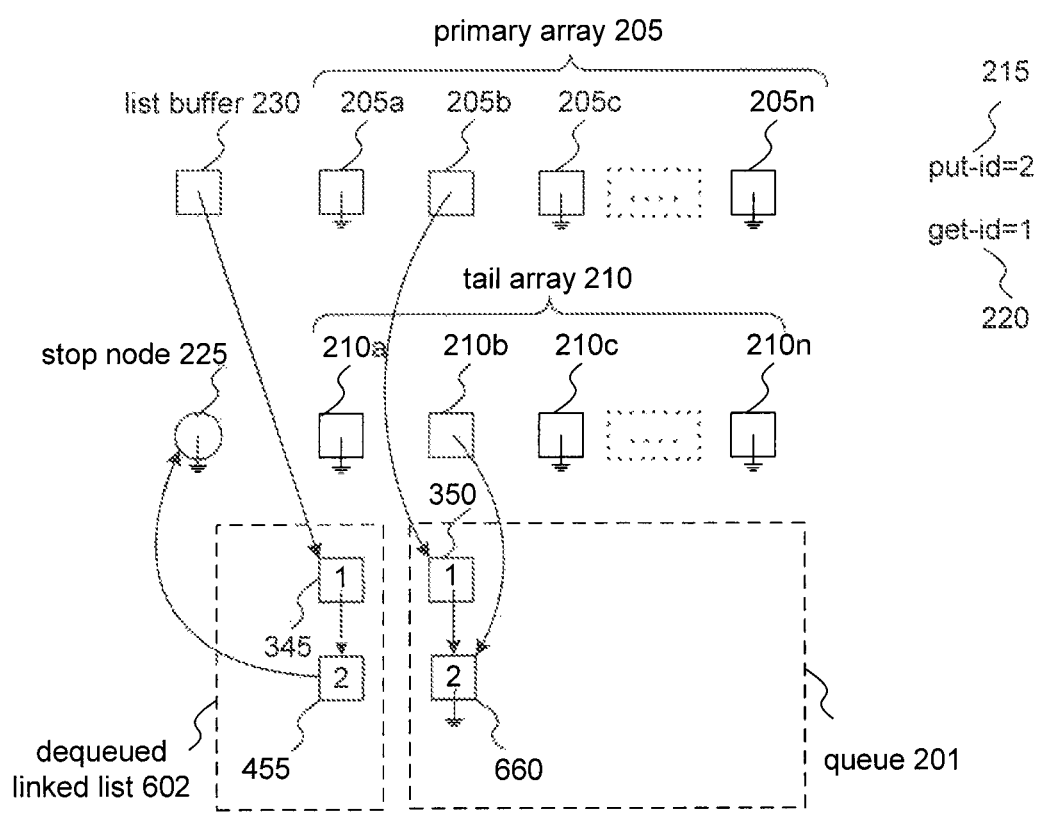
FIG. 6 illustrates a FIFO/LIFO queue after a linked list has been removed from the queue and a data element of the second priority type has been inserted in the queue, according to an example embodiment.

FIG. 6 illustrates FIFO/LIFO queue 201 after linked list 602 has been removed from queue 201 and a data element of the second priority type 660 has been inserted in queue 201, according to an example embodiment.

In an embodiment, a list buffer 230 including a reference is identified, and the reference included in list buffer 230 is updated to reference the data element at the head of linked list 602. For example, list buffer 230 may reference the data element at the initial location in queue 201. In an example, in FIG. 6, list buffer 230 is identified and updated to reference data element 345 at the head of linked list 602. Data element 345 at the head of linked list 602 is the data element at the initial location in queue 201 and is the oldest data element in queue 201. Linked list 602 includes data elements 345 and 455, and is removed from queue 201. Further, index get-id 220 is incremented to one, indicating a position in primary array 205 that may be used to remove the next data element from queue 201.

In an embodiment, after additional data elements are prevented from being added to linked list 602, another data element may be inserted in queue 201. Inserting another data element in queue 201 includes determining whether queue 201 is empty. When queue 201 is determined to be empty, the data element may be inserted at a second location, after the initial location, in queue 201. When queue 201 is determined to be not empty, it is determined whether the data element is of a first priority type or a second priority type. When the data element is determined to be of the first priority type, the data element is inserted in queue 201 after each existing data element of the first priority type in queue 201.

When the data element is determined to be of the second priority type, the data element is inserted into a second linked list, different from the first linked list, in queue 201. If linked list 602 has been removed from queue 201, a head of the second linked list is the oldest data element relative to the existing data elements in queue 201.

In the example of FIG. 6, data element 660 is of a second priority type and is inserted in the linked list in queue 201 by updating a reference included in data element 350 to reference data element 660. Further, tail array 210b at position one of tail array 210 is updated to reference data element 660, the most recently inserted data element in the linked list. Further, index put-id 215 is two, indicating that position two in primary array 205 is the next available position that may be used to insert a data element in queue 201.

In an embodiment, the code shown below (or functionally similar code) may be used to remove a data element of a first priority type or a second priority type from queue 201.

```
bool dequeue(Node ** node)
{
    if (NULL != list_buffer)         // there are nodes still in
                                     the list we buffered,
        return dequeue_from_buffer(node);   // return from the linked list
    if ( putid == getid )            // queue is empty
        return false;
    // there is an element or a list at index 'getid'. Move the list_buffer
    to point to it
    // we will use the list buffer to retrieve the elements
    int getlocal = getid;            // save current getindex locally
    list_buffer = array[getid];      // list buffer points to the element
                                        to retrieve
    getid = getid + 1% SIZE;
    getid = getlocal;   // increment getid, insert_firstprioritytype( ) will
    use be able to
      // use this slot. That is okay since we have already cached the
      //elements in list_buffer
      //insert_secondprioritytype( ) will use this slot if the queue becomes
      // empty otherwise it will try to use the tail pointer
    // loop until we are able to close the linked list
    while (true) {
    Node * temp = tails[getlocal];
    Node * next = temp->next;
    if ( CAS(&temp->next, NULL, &stopNode) )
    break;
    }
    // the linked list in now cached in list buffer. Return elements from
    list buffer
    return get_from_buffer(value);
}
// This is executed only in dequeuing thread with no contention
bool get_from_buffer(Node ** value)
{
    // we have returned everything from the list buffer, reset it
    if (list_buffer == &stopNode) {
      list_buffer = NULL;
      return false;
    }
    * value = list_buffer;
    list_buffer = list_buffer->next;
    return true;
}
```

After executing the above code (or functionally similar code), a next data element is retrieved, if available; otherwise a false value is returned. If queue 201 has no data elements of the second priority type, the data element at index get-id 220 is retrieved and index get-id 220 is incremented modulo N. If queue 201 has one or more data elements of the second priority type, they are retrieved from the linked list. In an embodiment, the linked list is closed from further insertions when one or more data elements is removed from queue 201. This may involve having the last data element in the linked list point to stop-node 225 using the atomic compare-and-swap operator and incrementing "get-id" 220 modulo N. Subsequent insertions of data elements of the second priority type will insert the new data element of the second priority type at the next location. The linked list is then detached from primary array 205 and tail array 210 and cached using list buffer 230. Element retrieval takes place from list buffer 230, with no contention with primary array 205 and tail array 210.

IV. Example System Embodiment

Figure 7:
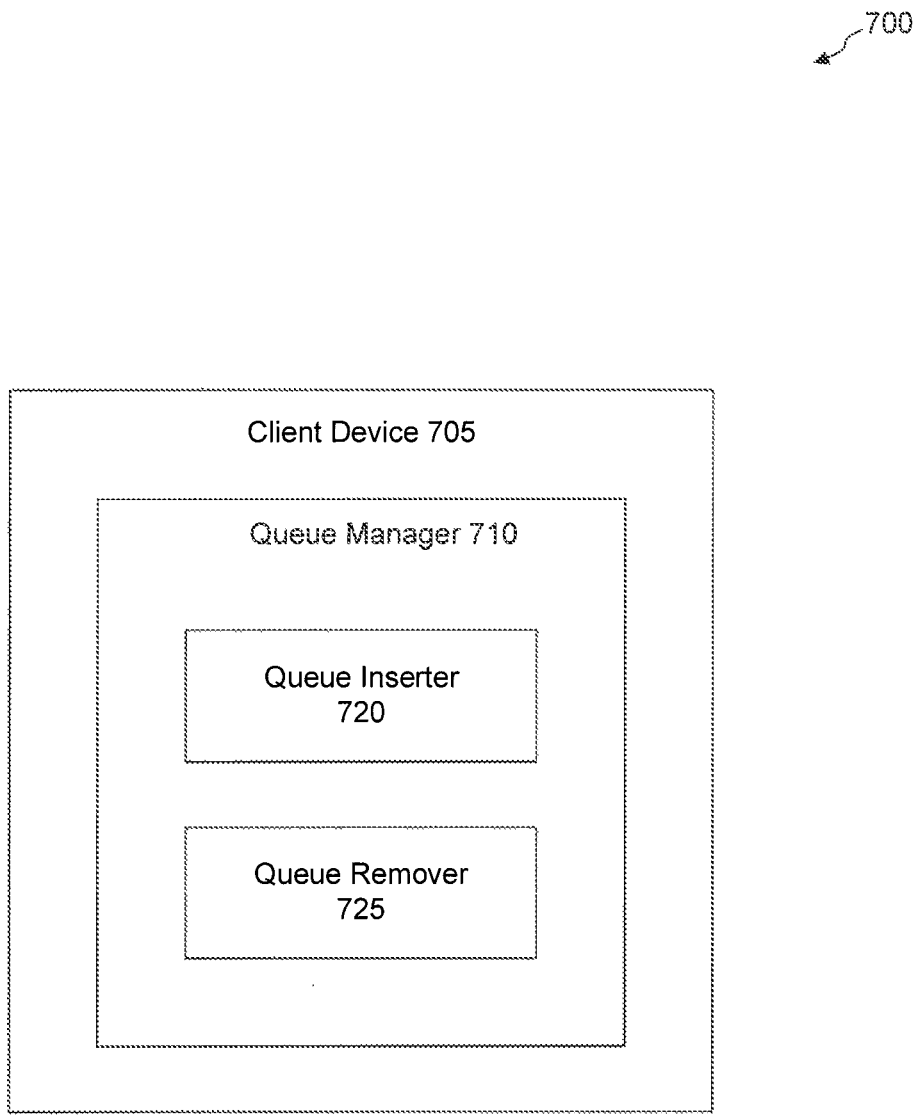
FIG. 7 illustrates a system for managing a lockless FIFO/LIFO queue, according to example embodiments.

FIG. 7 illustrates a system 700 for managing a lockless FIFO/LIFO queue, according to example embodiments.

System 700 includes a client device 705. Client device 705 is a computing device. Examples of computing devices include, but are not limited to, a central processing unit, an application-specific integrated circuit, a computer, workstation, distributed computing system, computer cluster, embedded system, stand-alone electronic device, networked device, mobile device (e.g. mobile phone, smart phone, personal digital assistant (PDA), navigation device, tablet or mobile computing device), rack server, set-top box, or other type of computer system having at least one processor and memory. A computing process performed by a clustered computing environment or server farm may be carried out across multiple processors located at the same or different locations. Such a computing device may include software, firmware, hardware, or a combination thereof. Software may include one or more applications and an operating system. Hardware can include, but is not limited to, a processor, memory and user interface display.

Client device 705 includes a queue manager 710. Queue manager 710 determines whether a queue is empty. When the queue is determined to be empty, queue manager 710 inserts a received data element at an initial location in the queue. When the queue is determined to be not empty, queue manager 710 determines whether the received data element is of a first priority type or a second priority type.

Queue manager 710 also includes a queue inserter 720 and a queue remover 725. Queue inserter 720 inserts data elements in a queue based on a priority type of the data element. When the data element is determined to be of the first priority type, queue inserter 720 inserts the data element in the queue after each existing data element of the first priority type in the queue. When the data element is determined to be of the second priority type, queue inserter 720 inserts the data element in the queue before each existing data element of the first priority type after the initial location in the queue.

Queue remover 725 removes one or more data elements from the queue.

V. Example Method Embodiment

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 8:
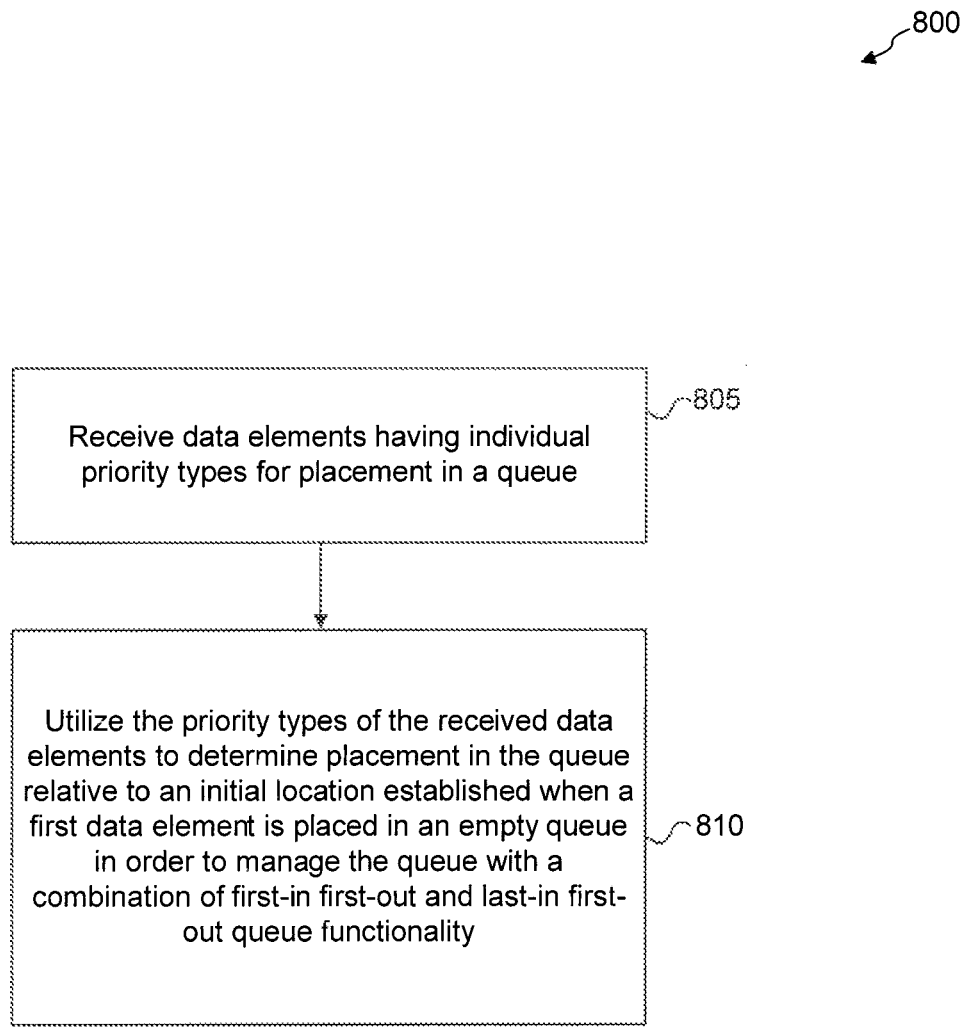
FIG. 8 illustrates a flowchart of a method for managing a lockless FIFO/LIFO queue, according to an example embodiment.

FIG. 8 illustrates a flowchart 800 of a method for managing data elements in a lockless FIFO/LIFO queue, according to example embodiments.

In a step 805, data elements having individual priority types for placement in a queue are received. In a step 810, the priority types of the received data elements are utilized to determine placement in the queue relative to an initial location established when a first data element is placed in an empty queue in order to manage the queue with a combination of first-in first-out and last-in first-out queue functionality.

Figure 9:
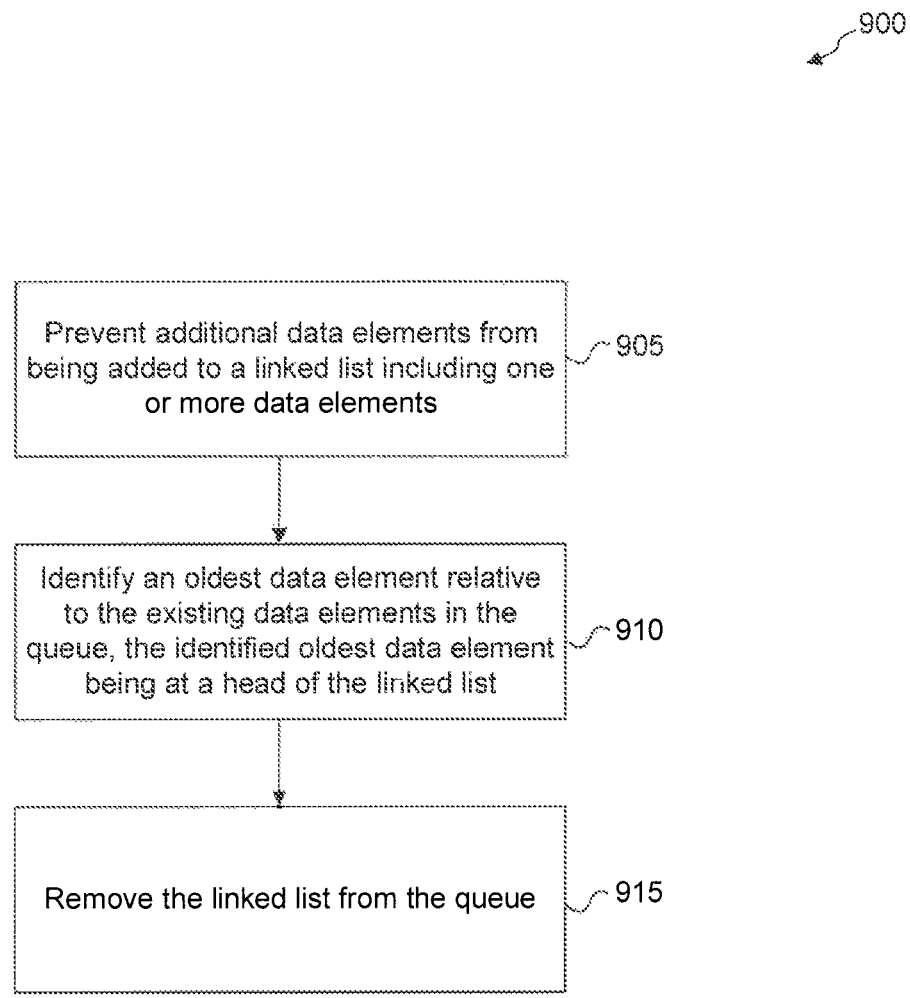
FIG. 9 illustrates a flowchart of a method for removing data elements from a lockless FIFO/LIFO queue, according to an example embodiment.
Figure 10:
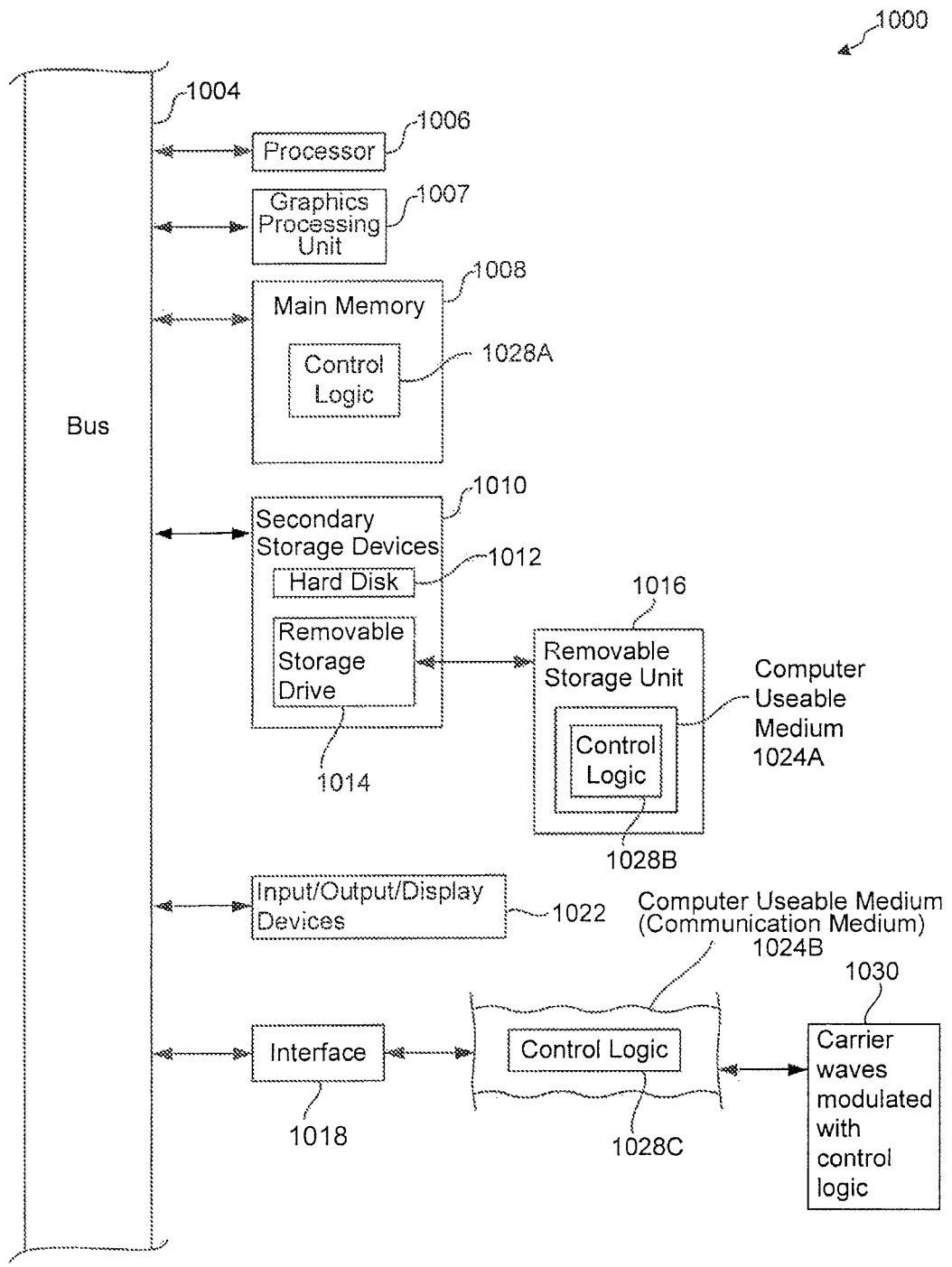
FIG. 10 illustrates an example computer system, according to an example embodiment.

FIG. 9 illustrates a flowchart 900 of a method for removing data elements from a lockless FIFO/LIFO queue, according to example embodiments.

In a step 905, additional data elements are prevented from being added to a linked list including one or more data elements. In a step 910, an oldest data element relative to the existing data elements in the queue is identified, the identified oldest data element being at a head of the linked list. In a step 915, the linked list is removed from the queue.

VI. Example Computer Implementation Embodiment

In an example embodiment, the systems and methods described herein are implemented using one or more well-known computers, such as computer 700 shown in FIG. 7.

Computer 1000 can be any commercially available and well known computer capable of performing the functions described herein, such as computers available from International Business Machines, Apple, Sun, HP, Dell, Compaq, Digital, Cray, etc.

Computer 1000 includes one or more processors (also called central processing units, or CPUs), such as a processor 1006. The processor 1006 is connected to a communication bus 1004. Processors 1006 may include any conventional or special purpose processor, including, but not limited to, digital signal processor (DSP), field programmable gate array (FPGA), and application specific integrated circuit (ASIC).

Computer 1000 includes one or more graphics processing units (also called GPUs), such as GPU 1007. GPU 1007 is a specialized processor that executes instructions and programs selected for complex graphics and mathematical operations in parallel.

Computer 1000 also includes a main or primary memory 1008, such as random access memory (RAM). The primary memory 1008 has stored therein control logic 1028A (computer software), and data.

Computer 1000 also includes one or more secondary storage devices 1010. The secondary storage devices 1010 include, for example, a hard disk drive 1012 and/or a removable storage device or drive 1014, as well as other types of storage devices, such as memory cards and memory sticks. The removable storage drive 1014 represents a floppy disk drive, a magnetic tape drive, a compact disk drive, an optical storage device, tape backup, etc.

The removable storage drive 1014 interacts with a removable storage unit 1016. The removable storage unit 1016 includes a computer useable or readable storage medium 1024 having stored therein computer software 1028B (control logic) and/or data. Removable storage unit 1016 represents a floppy disk, magnetic tape, compact disk, DVD, optical storage disk, or any other computer data storage device. The removable storage drive 1014 reads from and/or writes to the removable storage unit 1016 in a well-known manner.

Computer 1000 also includes input/output/display devices 1022, such as monitors, keyboards, pointing devices, touch-screen displays, etc.

Computer 1000 further includes a communication or network interface 1018. The network interface 1018 enables the computer 1000 to communicate with remote devices. For example, the network interface 1018 allows computer 1000 to communicate over communication networks or mediums 1024B (representing a form of a computer useable or readable medium), such as LANs, WANs, the Internet, etc. The network interface 1018 may interface with remote sites or networks via wired or wireless connections.

Control logic 1028C may be transmitted to and from computer 1000 via the communication medium 1024B. More particularly, the computer 1000 may receive and transmit carrier waves (electromagnetic signals) modulated with control logic 1030 via the communication medium 1024B.

Any apparatus or manufacture comprising a computer useable or readable medium having control logic (software) stored therein is referred to herein as a computer program product or program storage device. This includes, but is not limited to, the computer 1000, the main memory 1008, the secondary storage devices 1010, the removable storage unit 1016 and the carrier waves modulated with control logic 1030. Such computer program products, having control logic stored therein that, when executed by one or more data processing devices, cause such data processing devices to operate as described herein, represent embodiments of the invention.

Embodiments can work with software, hardware, and/or operating system implementations other than those described herein. Any software, hardware, and operating system implementations suitable for performing the functions described herein can be used.

It is to be appreciated that the Detailed Description section, and not the Summary and Abstract sections, is intended to be used to interpret the claims. The Summary and Abstract sections may set forth one or more, but not all, exemplary embodiments of the invention as contemplated by the inventor(s), and thus, are not intended to limit the invention and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

What is claimed is:

1. A method for managing a lockless queue comprising:
    receiving data elements having individual priority types for placement in a queue;
    utilizing the priority types of the received data elements to determine placement in the queue relative to an initial location established when a first data element is placed in an empty queue in order to manage the queue with a combination of first-in first-out and last-in first-out queue functionality; and
    removing one or more data elements from the queue, the removing including:
        preventing additional data elements from being added to a linked list including one or more second data elements, the preventing including identifying a most recently inserted data element in the linked list, the most recently inserted data element including a reference to a value, and updating the reference included in the most recently inserted data element to reference a stop node,
        identifying an oldest data element relative to the existing data elements in the queue, the identified oldest data element being at a head of the linked list, and
        removing the linked list from the queue.

2. The method of claim 1, further comprising:
    determining whether the queue is empty;
    when the queue is determined to be empty, inserting a received data element at the initial location in the queue; and
    when the queue is determined to be not empty, determining whether the received data element is of a first priority type or a second priority type,
    wherein the utilizing the priority types includes:
        when the received data element is determined to be of the first priority type, inserting the received data element in the queue after each existing data element of the first priority type in the queue; and
        when the received data element is determined to be of the second priority type, inserting the received data element in the queue before each existing data element of the first priority type after the initial location in the queue.

3. The method of claim 1, wherein the utilizing the priority types of the received data elements to determine placement in the queue includes inserting the received data elements into the linked list.

4. The method of claim 2, wherein the data element at the initial location in the queue is an oldest data element relative to the existing data elements in the queue.

5. The method of claim 2, wherein the inserting the received data element in the queue before each existing data element of the first priority type after the initial location in the queue includes:
    identifying a most recently inserted data element in the linked list, the most recently inserted data element including a reference, and the linked list including an oldest data element in the queue; and
    inserting the received data element of the second priority type into the linked list by updating the reference included in the identified most recently inserted data element to reference the received data element of the second priority type.

6. The method of claim 1, further comprising:
    traversing the removed linked list starting at the head of the removed linked list; and
    processing one or more data elements in the removed linked list based on an order in which the removed linked list is traversed.

7. The method of claim 1, further including:
    identifying a list buffer including a reference;
    updating the reference included in the list buffer to reference the data element at the initial location in the queue.

8. The method of claim 1, further including:
after the preventing additional data elements from being added to the linked list, inserting a second received data element in the queue, the inserting a second received data element in the queue including:
determining whether the queue is empty;
when the queue is determined to be empty, inserting the second received data element at a second location, after the initial location, in the queue;
when the queue is determined to be not empty, determining whether the second received data element is of a first priority type or a second priority type;
when the second received data element is determined to be of the first priority type, inserting the second received data element in the queue after each existing data element of the first priority type in the queue; and
when the second received data element is determined to be of the second priority type, inserting the second received data element in a second linked list, different from the first linked list, in the queue.

9. The method of claim 1, wherein the linked list includes the first data element of a first priority type, and wherein the utilizing the priority types of the received data elements to determine placement in the queue further comprises:
inserting a second data element of second priority type higher than the first priority type into the linked list after the first data element, wherein the second data element is before the first data element in the queue.

10. A system for maintaining a lockless queue comprising:
a memory; and
at least one processor coupled to the memory and configured to:
receive data elements having individual priority types for placement in a queue;
utilize the priority types of the received data elements to determine placement in the queue relative to an initial location established when a first data element is placed in an empty queue in order to manage the queue with a combination of first-in first-out and last-in first-out queue functionality; and
remove one or more data elements from the queue, the removing including:
preventing additional data elements from being added to a linked list including one or more second data elements, the preventing including identifying a most recently inserted data element in the linked list, the most recently inserted data element including a reference to a value, and updating the reference included in the most recently inserted data element to reference a stop node,
identifying an oldest data element relative to the existing data elements in the queue, the identified oldest data element being at a head of the linked list, and removing the linked list from the queue.

11. The system of claim 10, wherein the at least one processor is further configured to:
determine whether the queue is empty;
when the queue is determined to be empty, insert a received data element at the initial location in the queue;
when the queue is determined to be not empty, determine whether the received data element is of a first priority type or a second priority type;
when the received data element is determined to be of the first priority type, insert the received data element in the queue after each existing data element of the first priority type in the queue; and
when the received data element is determined to be of the second priority type, insert the received data element in the queue before each existing data element of the first priority type after the initial location in the queue.

12. The system of claim 11, wherein when the at least one processor inserts the received data element in the queue before each existing data element of the first priority type after the initial location in the queue, the at least one processor inserts the received data element into the linked list.

13. The system of claim 11, wherein the data element at the initial location in the queue is an oldest data element relative to the existing data elements in the queue.

14. The system of claim 11, wherein when the at least one processor inserts the received data element in the queue before each existing data element of the first priority type after the initial location in the queue, the at least one processor is configured to:
identify a most recently inserted data element in the linked list, wherein the most recently inserted data element includes a reference to a value, and the linked list includes an oldest data element in the queue; and
insert the received data element of the second priority type into the linked list by updating the reference included in the identified most recently inserted data element to reference the received data element of the second priority type.

15. The system of claim 10, wherein when the at least one processor removes one or more data elements, the at least one processor is configured to:
traverse the removed linked list starting at the head of the linked list; and
process one or more data elements in the removed linked list based on an order in which the removed linked list is traversed.

16. A non-transitory computer-readable medium having instructions stored thereon, the instructions causing at least one processor to perform operations, the operations comprising:
receiving data elements having individual priority types for placement in a queue;
utilizing the priority types of the received data elements to determine placement in the queue relative to an initial location established when a first data element is placed in an empty queue in order to manage the queue with a combination of first-in first-out and last-in first-out queue functionality; and
removing one or more data elements from the queue, the removing including:
preventing additional data elements from being added to a linked list including one or more second data elements, the preventing including identifying a most recently inserted data element in the linked list, the most recently inserted data element including a reference to a value, and updating the reference included in the most recently inserted data element to reference a stop node,
identifying an oldest data element relative to the existing data elements in the queue, the identified oldest data element being at a head of the linked list, and removing the linked list from the queue.

* * * * *